No. 732,993. PATENTED JULY 7, 1903.
A. ANGST.
SPEED CHANGING DEVICE FOR MOTOR CARS.
APPLICATION FILED AUG. 20, 1902.
NO MODEL. 4 SHEETS—SHEET 1.

Witnesses:

Inventor:
Adolph Angst
By

No. 732,993. PATENTED JULY 7, 1903.
A. ANGST.
SPEED CHANGING DEVICE FOR MOTOR CARS.
APPLICATION FILED AUG. 20, 1902.
NO MODEL.
4 SHEETS—SHEET 3.

Witnesses:

Inventor:
Adolph Angst
By
Henry Orth Jr
Atty

No. 732,993. PATENTED JULY 7, 1903.
A. ANGST.
SPEED CHANGING DEVICE FOR MOTOR CARS.
APPLICATION FILED AUG. 20, 1902.
NO MODEL. 4 SHEETS—SHEET 4.

No. 732,993. Patented July 7, 1903.

UNITED STATES PATENT OFFICE.

ADOLF ANGST, OF SCHAFFHAUSEN, SWITZERLAND.

SPEED-CHANGING DEVICE FOR MOTOR-CARS.

SPECIFICATION forming part of Letters Patent No. 732,993, dated July 7, 1903.

Application filed August 20, 1902. Serial No. 120,358. (No model.)

*To all whom it may concern:*

Be it known that I, ADOLF ANGST, a citizen of the Republic of Switzerland, residing at Schaffhausen, Switzerland, have invented new and useful Improvements in a Speed-Changing Device for Motor-Cars and Machinery in General, of which the following is a specification.

This invention has for its object a speed-changing device for motor-cars and machinery in general, said device having a grooved wheel or cone operated by the driving-shaft and a conical internally-grooved wheel having grooves of different diameters corresponding to the conicalness of the grooved wheel from one groove to the other, while the grooved wheel and internally-grooved cone may be moved relatively to one another in such a way that the grooved cone engages with one or other groove, and consequently with a constant speed of the driving-shaft another speed of the internally-grooved cone may be obtained.

Figure 1:
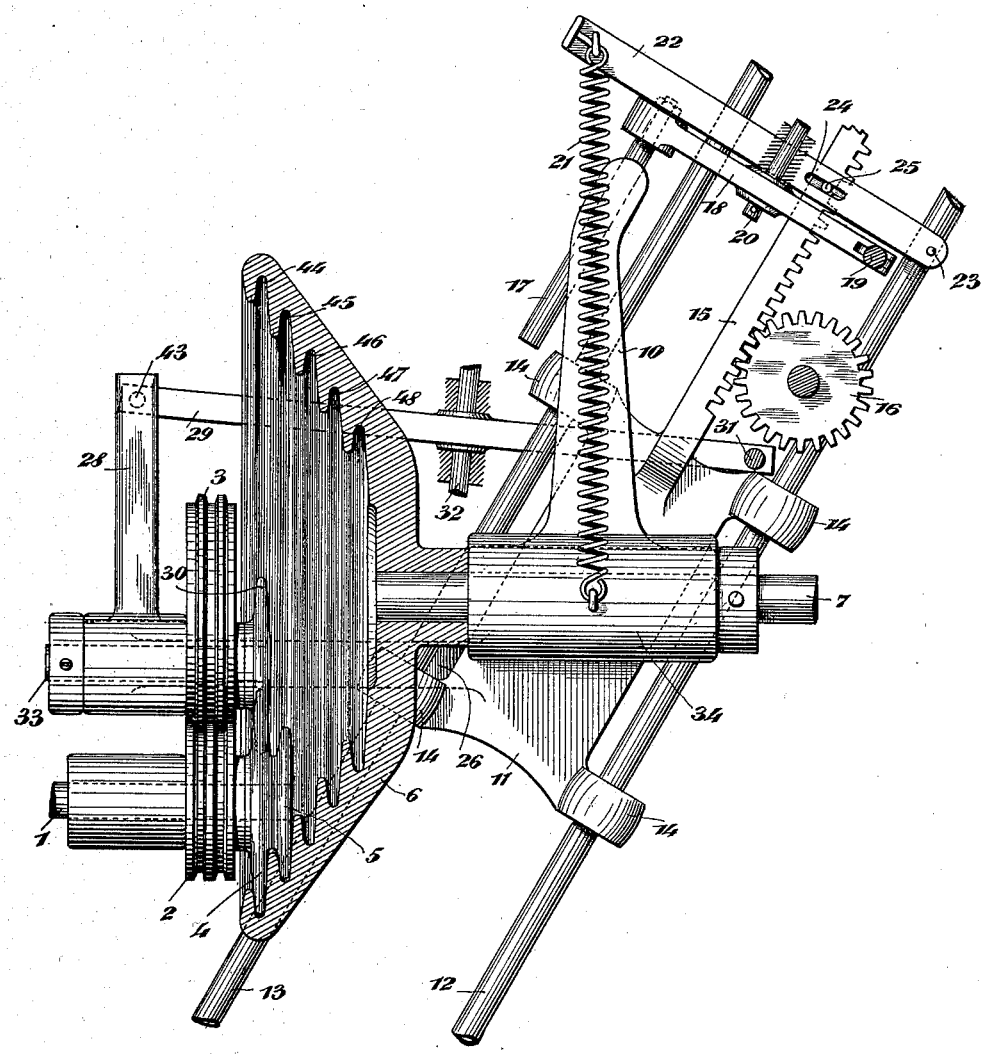
Figure 2:
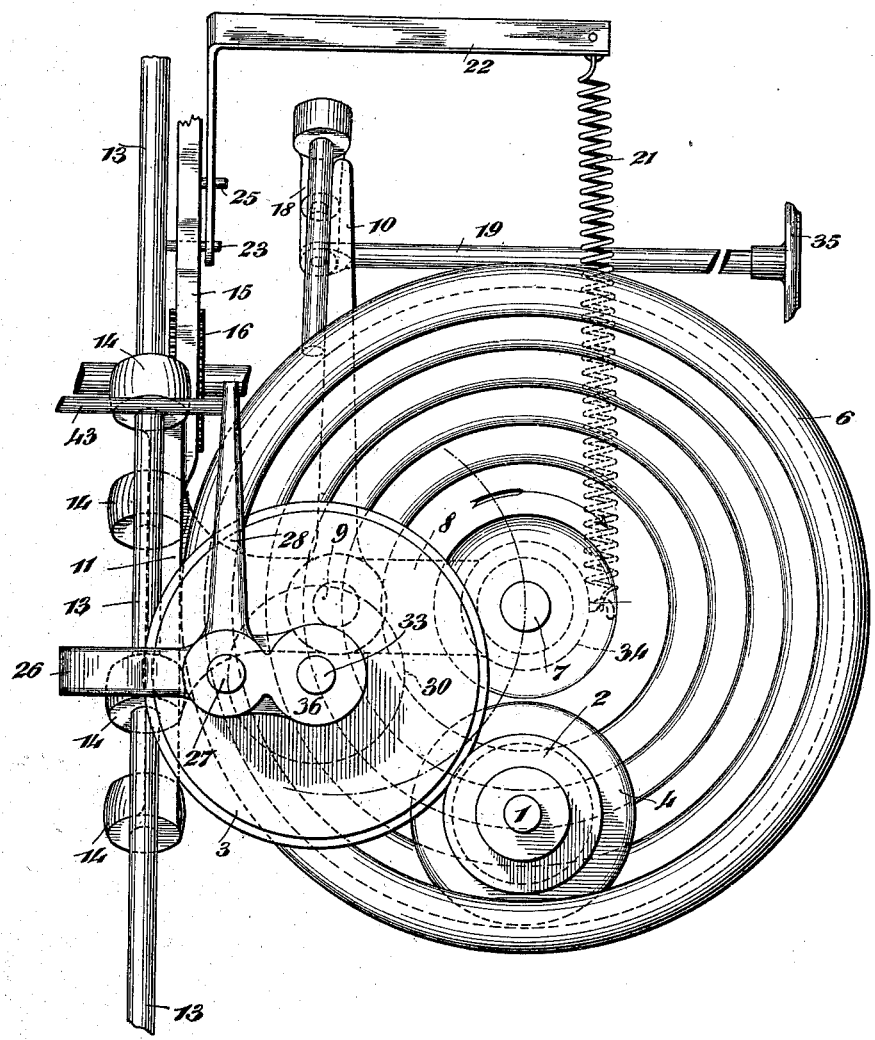
Figure 3:
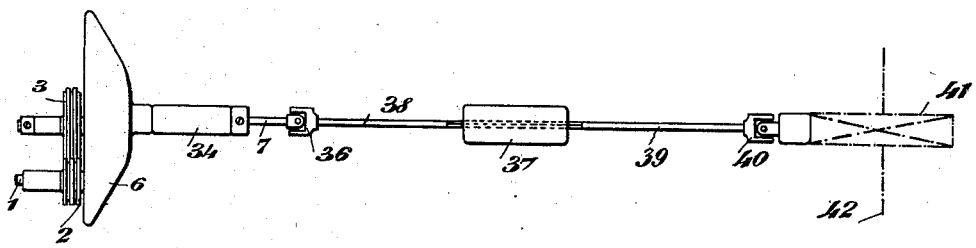
Figure 4:
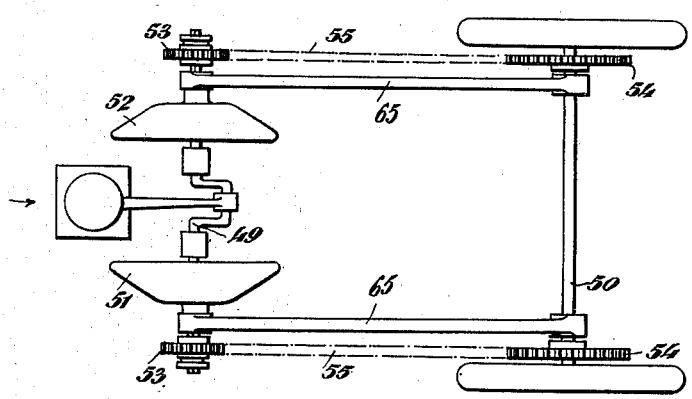
Figure 5:
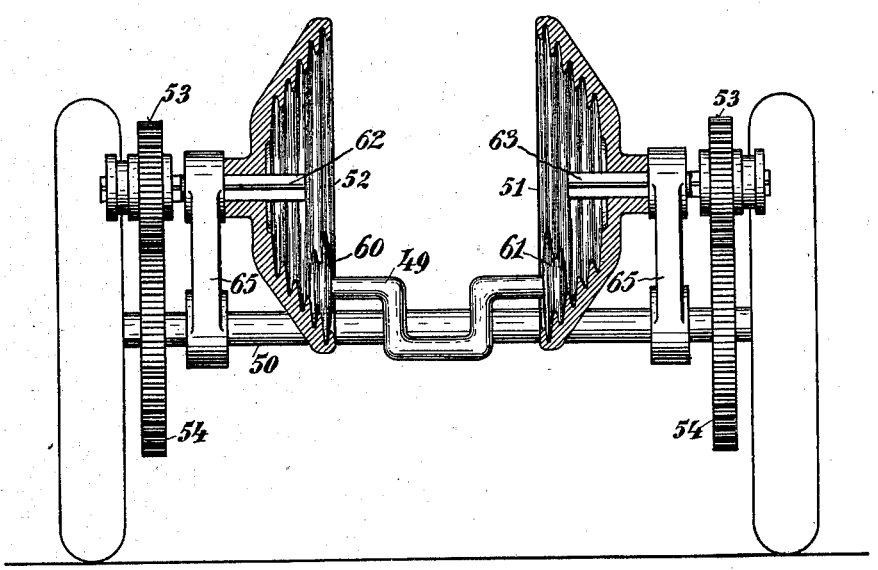

In the accompanying drawings, Figures 1 and 2 show as an example a form of construction of the object of the invention, Fig. 1 being a plan view, partially in section, and Fig. 2 a front view, of the main parts of the apparatus. Fig. 3 shows the connection of the motor-shaft by means of a change-gear and other parts with the rear wheel-axle of a motor-car, while Fig. 4 shows an arrangement suitable for a goods-carrying motor-car; and Fig. 5 is a vertical section through the wheels 51 and 52 of Fig. 4 looking from the left.

1 is the driving-shaft, on which there is mounted a grooved wheel 2, adapted to be engaged by a grooved wheel 3, and said shaft 1 also carries a double-grooved wheel 4 5. This double-grooved wheel 4 5 may be brought into engagement with the grooves of a conical internally-grooved cone or wheel 6. The internally-grooved cone 6 is firmly mounted on a shaft 7, which is mounted in a suitable bearing 34, carried by an arm 8 of an elbow-lever 8 10. The elbow-lever 8 10 is pivotally mounted on a pin 9, carried by a carriage 11, and is acted on by a spiral spring 21, attached to a lever 22, which spring tends to press the internally-grooved cone 6 against the double-grooved wheel 4 5. The lever 22 pivots on a fixed pin 23 and engages, by means of a slot 24, over a pin 25, fixed on a rack-bar 15. The rack-bar 15 is connected with the carriage or slide 11, which is adapted to slide by means of loose collars 14 on fixed bars 12 13. A toothed pinion 16, adapted to be operated by means of a hand-wheel from the driver's seat when the apparatus is employed for motor-cars, for instance, gears with the rack-bar 15. The arm 10 of the elbow-lever bears against a rod 17, carried by a two-armed lever 18, pivoting on a pin 20, which lever 18 may be operated by means of a rod 19 and a tread-plate 35 located thereon. A bell-crank lever pivoted on a pin 27 is mounted on an arm 26, carried by the carriage 11, one arm 36 of said lever carrying the bearing of a pin 33, on which the grooved wheel 3 is mounted, while the other arm 28 bears against a pin 43 of a two-armed lever 29, pivotally mounted at 32, which lever 29 may be operated by means of a foot-plate (which is not shown) located on the arm 31. On the pin 33, in addition to the grooved wheel 3, there is also a grooved disk 30, situated in the plane of the groove 44.

Fig. 3 shows the connection of the motor-shaft by means of the change and rotating gear hereinbefore described with the rear axle of a motor-car. 1 is the motor-shaft; 2, the grooved wheel mounted thereon, which may be brought into gear with the grooved wheel 3, carried by an arm 26, and 6 is an internally-grooved cone mounted on the shaft 7. This shaft is connected, by means of a universal joint 36, with a shaft 38, longitudinally adjustable in a coupling-sleeve 37, and the coupling-sleeve connects the shaft 38 with a shaft 39, lying in the prolongation of the shaft 38, which shaft 39 is connected with a differential gear 41 by a universal joint 40, the rear axle 42 being driven by this differential gear. In forward traveling the grooved wheel 3 is out of engagement with wheel 2 and grooved disk 30 out of engagement with the internally-grooved cone 6. The grooves of the latter are of different diameter, as may be seen in the drawings, and the diameter alters from one groove to another, corresponding to the conicity of the grooved cone 6. The same applies to the diameter of the disks, the parts of the double-grooved disk 4 5 being of different sizes, corresponding to the conicity of the grooved cone 6. These disks are so arranged side by side that they may engage in two grooves lying side by side. According to the grooves in which the grooved disks 4 5 engage, another transmission-gear, and thereby another speed, may be given to the vehicle. For slow traveling the double-grooved disk 4 5 stands in gear with the grooves 44 45 of the grooved cone 6. If it be desired to travel more quickly, the tread-plate 35 is depressed, causing the arm 10 to be lifted by the rod 17, and the grooved cone 6, by turning on pin 9, is brought out of engagement with the disk 4 5. The toothed pinion 16 is then turned in such a way that the rack-bar 15, and with it the carriage 11 and grooved cone 6, are displaced so far that, for instance, grooves 46 and 47 face the disks 4 5, and the plate 35 is then released, so that the grooved wheel 6 is pressed against the disks 4 5 under the influence of the spring 21, which has been somewhat less stretched by the displacement of the pin 25.

The turning of the grooved cone-wheel on the pin 9 and the displacement of the same is rendered possible by means of the universal joints 36 and 40 and by the adjustability of the shaft 38 in the sleeve 37.

If it be desired to still further increase the speed, a similar method is adopted, the disks 4 5 being brought into engagement with the grooves 47 and 48. If it be desired to travel backward, the grooved cone 6 is returned into the position shown in Figs. 1 and 2, in which the grooved wheels 2 and 3 face one another. In this position these grooved wheels are still out of engagement and the grooved disk 30 has not yet been pressed into the groove 44. By depressing the rod 31 a turning of the elbow-lever 28 36 may, however, be produced, whereby the grooved wheel 3 is pressed against the grooved wheel 2 and the disk 30 into the groove 44, and, further, to allow of a suitable turning of the elbow-lever the grooved cone 6 is moved away from the double-grooved disk 4 5, and thereby brought out of engagement. By this means when traveling slowly a reversal of the direction of movement of the grooved cone, and thereby of the vehicle, is brought about. The arrangement hereinbefore described, owing to its working with grooved wheels and cone, possesses the advantage over other devices for the same object, which, however, work with ordinary friction-wheels, that even when only pressed slightly together an engagement of the parts takes place, and therefore even with the greatest loads there is no need to fear slipping in the gear. The arrangement of the lever 22, which moves with the slide, is such that in the case of slow traveling, where usually the load is the greatest, (hill climbing,) the parts are most firmly pressed together, as in this case the spring is most stretched. The arrangement adopted of grooved disks inside a grooved cone has also the advantage of reducing to a minimum the slipping of the working surfaces, and thereby so-called "false friction," as the axes of rotation of the grooved cone and the grooved disks lie on the same side of the contact-place, so that the parts encounter one another at points on the circumference of circles which vary in an equal sense and not as in previous arrangements of circles the diameter of which increase in the one part when it diminishes in the other part, and vice versa.

Of course the grooved disks 4 5 may also consist of only one or of more than two separate disks. The same remark applies also to the grooved disk 30.

In Figs. 4 and 5 the driving-shaft 49 of the motor is arranged parallel to the rear axle 50 and operates two cone-wheels 60 and 61. These cone-wheels are such as to be engaged by two shiftable cones 52 and 51, slidably mounted on stub-shafts 62 and 63, that are rotatably mounted in the frame 65, whose rear end can be moved about the rear axle 50 as a center. These stub-shafts carry, respectively, sprocket-wheels 53, that are chain-connected to the ones, 54, rigidly mounted on the rear axle 50. When the frame 65 is lowered, any suitable shift-levers or equivalent devices (not shown) move the cones 62 and 63 simultaneously toward and from each other the required distance on their shafts, and the frame is then lifted to bring the cones into engagement with the wheels 60 and 61, thereby bringing grooves of different diameter into engagement with said wheels 60 and 61. The movement of the grooved cones is transmitted to the rear wheel-axle by means of chain-gear 53 54 55.

The application of the device for changing of speed in motor-cars is illustrated in Figs. 3 and 4. It is, however, also possible to utilize this arrangement in other cases for changing speed in machinery of all kinds.

Having thus particularly described and ascertained the nature of my said invention and the manner of its application, what I claim is—

1. In a speed-changing mechanism, a driving-shaft, a friction-wheel thereon, a stepped friction-cone and means to move the cone into and out of engagement with the wheel, substantially as described.

2. In a speed-changing mechanism, a driving-shaft, a friction-wheel thereon, a stepped friction-cone, means to move the cone into and out of engagement with the wheel, and mechanism intermediate the cone and driving-shaft to reverse the direction of rotation of the cone, substantially as described.

3. In a speed-changing mechanism, a driving-shaft, two friction-wheels thereon, a stepped friction-cone, means to move the cone into and out of engagement with one of said wheels, a shaft, two friction-wheels thereon and means to move the shaft and wheels into and out of operative relation to the cone and the other friction-wheel on the driving-shaft, substantially as described.

4. In a speed-changing mechanism, the combination with a driving-shaft, and a friction-wheel thereon; of a carriage movable in a direction inclined to the axis of the driving-shaft, a stepped friction-cone and its bearing both movable with the carriage and also having independent movement, a rack on the carriage, a pivoted lever operated by said rack, a spring between the lever and cone-bearing, substantially as described.

5. In a speed-changing mechanism, the combination with a driving-shaft and a friction-wheel thereon; of a carriage movable in a direction inclined to the axis of the driving-shaft, an elbow-lever mounted on the carriage, a stepped friction-cone mounted in one arm of said elbow, a rack and pinion to move the carriage, a pivoted lever moved by the rack, a spring between the said pivoted and elbow levers, and means to rock the elbow-lever, substantially as described.

6. In a speed-changing mechanism, the combination with a driving-shaft and a friction-wheel thereon; of a stepped friction-cone and means to yieldingly hold the cone in engagement with the wheel, substantially as described.

7. In a speed-changing mechanism, the combination with a driving-shaft and a friction-wheel thereon; of a stepped friction-cone driven by the friction-wheel, and means to yieldingly hold said cone in engagement with the friction-wheel with a pressure inversely proportional to the stepped speeds at which the cone is driven, substantially as described.

8. In a speed-changing mechanism, the combination with a driving-shaft, and two friction-wheels thereon; of a movable carriage, an elbow-lever mounted on the carriage, a stepped friction-cone journaled in the elbow-lever, means to move the carriage, to cause the cone to engage one of the friction-wheels and means to move the elbow-lever, a bell-crank lever mounted on the carriage, two friction-wheels mounted on one arm of said bell-crank lever, one of said friction-wheels adapted to engage the cone and the other to engage the second wheel on the driving-shaft, and means to move the bell-crank lever, substantially as described.

9. The combination with a driven shaft; of a frame pivoted on the shaft at one end, a driving-shaft having a friction-wheel thereon, a stepped friction-cone and shaft mounted at one end of the frame, chain driving mechanism between the cone-shaft and driven shaft, means to move the cone into and out of frictional engagement with the friction-wheel, and reversing mechanism adapted to be interposed between the driving-shaft and cone, substantially as described.

In testimony whereof I have signed my name to this specification in the presence of two subscribing witnesses.

ADOLF ANGST.

Witnesses:
 A. LIEBERKNECHT,
 M. VEITH.